UNITED STATES PATENT OFFICE.

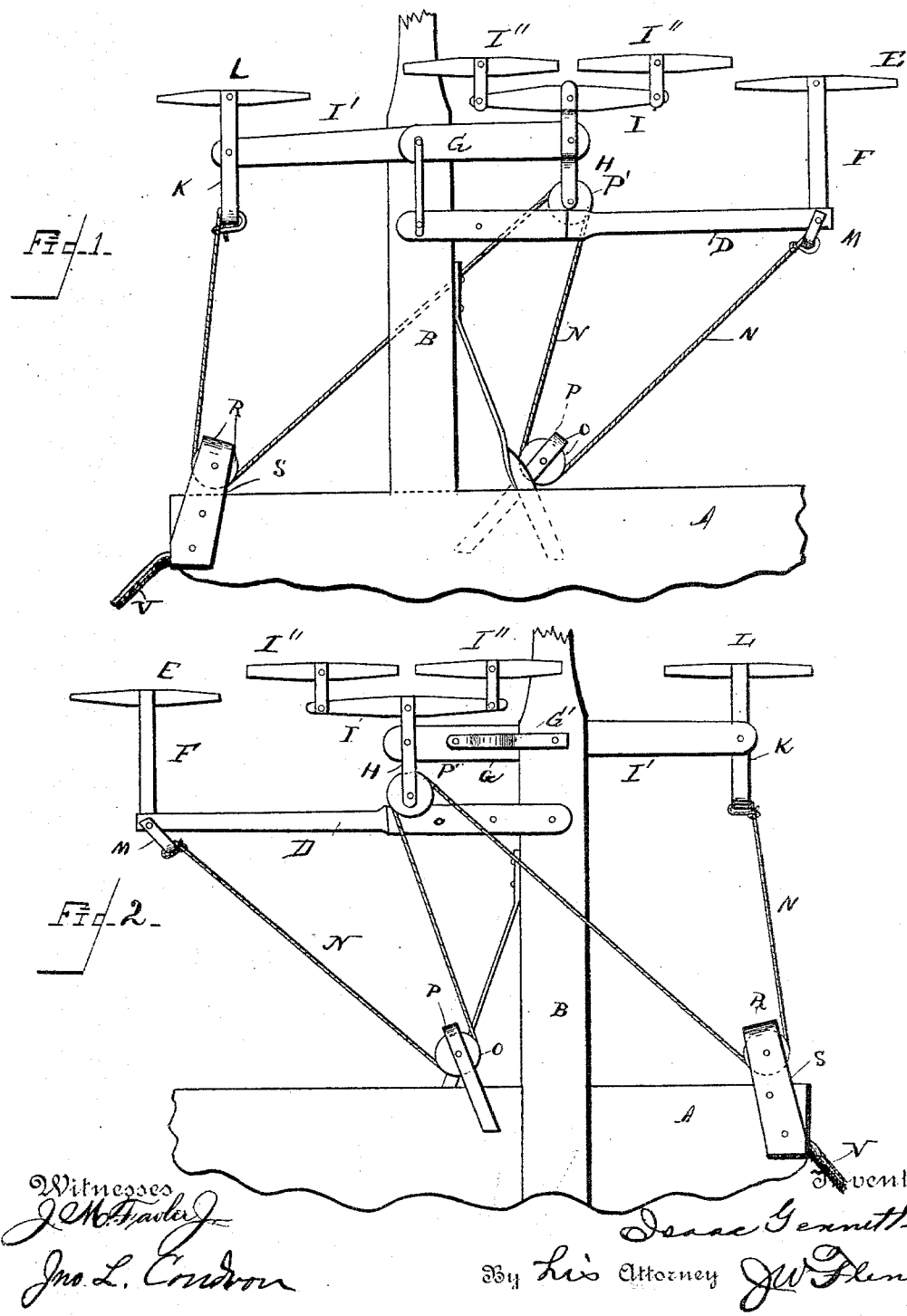

ISAAC GENNETTE, OF AURORA, KANSAS.

DRAFT-EQUALIZER.

SPECIFICATION forming part of Letters Patent No. 412,248, dated October 8, 1889.

Application filed July 10, 1889. Serial No. 317,077. (No model.)

*To all whom it may concern:*

Be it known that I, ISAAC GENNETTE, a citizen of the United States, residing at Aurora, in the county of Cloud and State of Kansas, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers of that class in which one animal of the team is hitched at one side of the pole or tongue and the remaining animals at the other side of the same, and in which the draft is equalized by applying the same to various points of a rope or chain suitably guided over pulleys to yield freely to the strain thereupon; and it consists in the improved construction and arrangement or combination of parts, hereinafter fully disclosed in the description, drawings, and claim.

The objects of my invention are to equalize the draft of four animals and to prevent side draft by the larger number of animals arranged at one side of the pole or tongue. These objects are attained in the draft-equalizer illustrated in the accompanying drawings, forming part of this specification, in which the same reference-letters indicate the same parts, and in which—

Figure 1 represents a top plan view of my improved draft-equalizer, and Fig. 2 a bottom or inverted plan view of the same.

In the drawings the letter A indicates the front portion of the frame of a grain-binder, the grain-table and finger-bar of which are supposed to be arranged to the left of said frame in Fig. 1, and consequently to the right of the same in Fig. 2. The pole or tongue B projects forward from said frame, and has the inner end of a long lever D pivoted to it, said lever projecting to the right of the tongue. A long link F is pivoted to the outer end of said lever, and has a singletree E pivoted to its forward end. A short lever G is pivoted at one end to the tongue, to project in the same direction as said lever D and forward of the same, and said lever G is braced by a pivoted brace G' upon its under side and the under side of the tongue. A link H is pivoted to the outer end of said lever, and has a doubletree I pivoted to its forward end, to the forward ends of which singletrees I'' I'' are pivoted. Another lever I' is pivoted upon the tongue and upon the same pin or bolt as lever G and projects in the opposite direction to the same. A link K is pivoted to the outer end of said lever, and has a singletree L pivoted upon its forward end. A rope or chain N is secured to the rear end of said link K, passes around a sheave R, which is journaled in a strap S at the end of the frame near the finger-bar, passes obliquely forward and around a pulley or sheave P', journaled in the rear end of the link H of the short lever G, and passes obliquely rearward around a pulley O in a strap P upon the frame and near the tongue, and obliquely forward to a link M upon the outer end of lever D. The two central horses pulling through their singletrees I'' upon the doubletree I will be equalized by the two outer horses pulling upon their singletrees, as the latter pull upon the ends of the rope or chain while the former pull upon the doubled middle of the same, and the levers D, G, and I' simply serve as movable braces or props to support the singletrees and doubletree. By arranging the pulleys upon the frame toward the center of the entire machine and toward the table and finger-bar an oblique draft away from said table and bar will be established, which will counterbalance the side pull of the cutting apparatus in said bar, so that the pull of the horses will be in a straight forward line, and will likewise counterbalance the side pull or strain in the same direction caused by having the greater number of horses upon the side of the tongue opposite to the table and finger-bar. The lateral strain of the table and cutting apparatus is conveyed over upon the frame by an oblique bar V, which is secured to the end of said frame A and to the middle of the table.

Having thus fully described the construction and arrangement or combination of the several parts of my draft-equalizer, its operation and advantages, what I claim as new is—

In a four-horse draft-equalizer, the combination, with the frame A and tongue B, of the levers D, G, and I', pivoted, respectively, to project at opposite sides of said tongue, the singletree E, doubletree I, and singletree L, pivoted to the ends of said levers, the pulleys R and O, arranged at the inner end of the frame and at the tongue, the pulley P' upon the end of lever G, and the chain or rope N, secured to the ends of levers D and I' and passed around said pulleys to run obliquely forward from the inner portion of the frame A, substantially as described.

In testimony whereof I affix my signature in presence of two witnesses.

ISAAC GENNETTE.

Witnesses:
 F. A. McDONALD,
 C. M. TROUP.